Patented Jan. 23, 1940

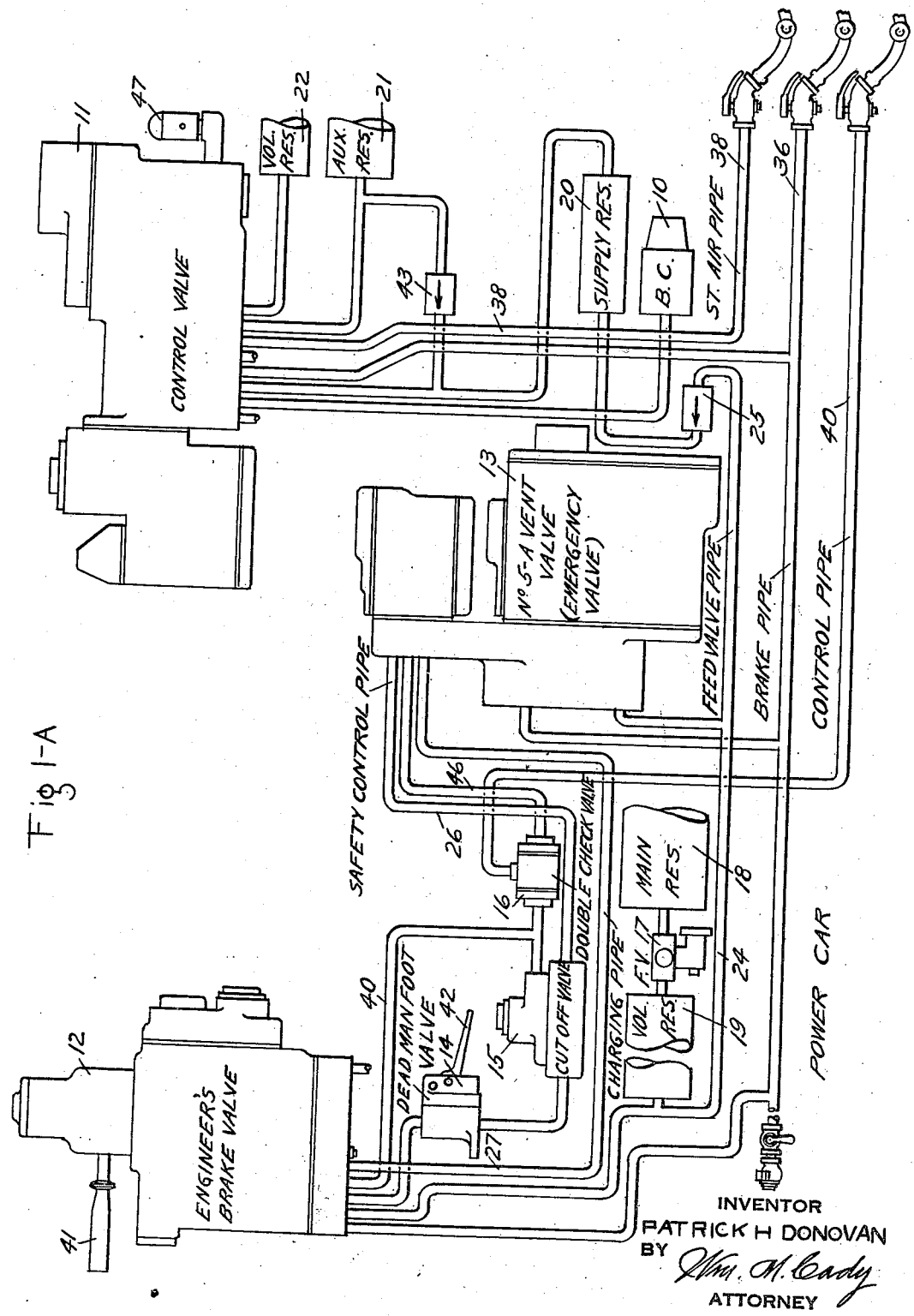

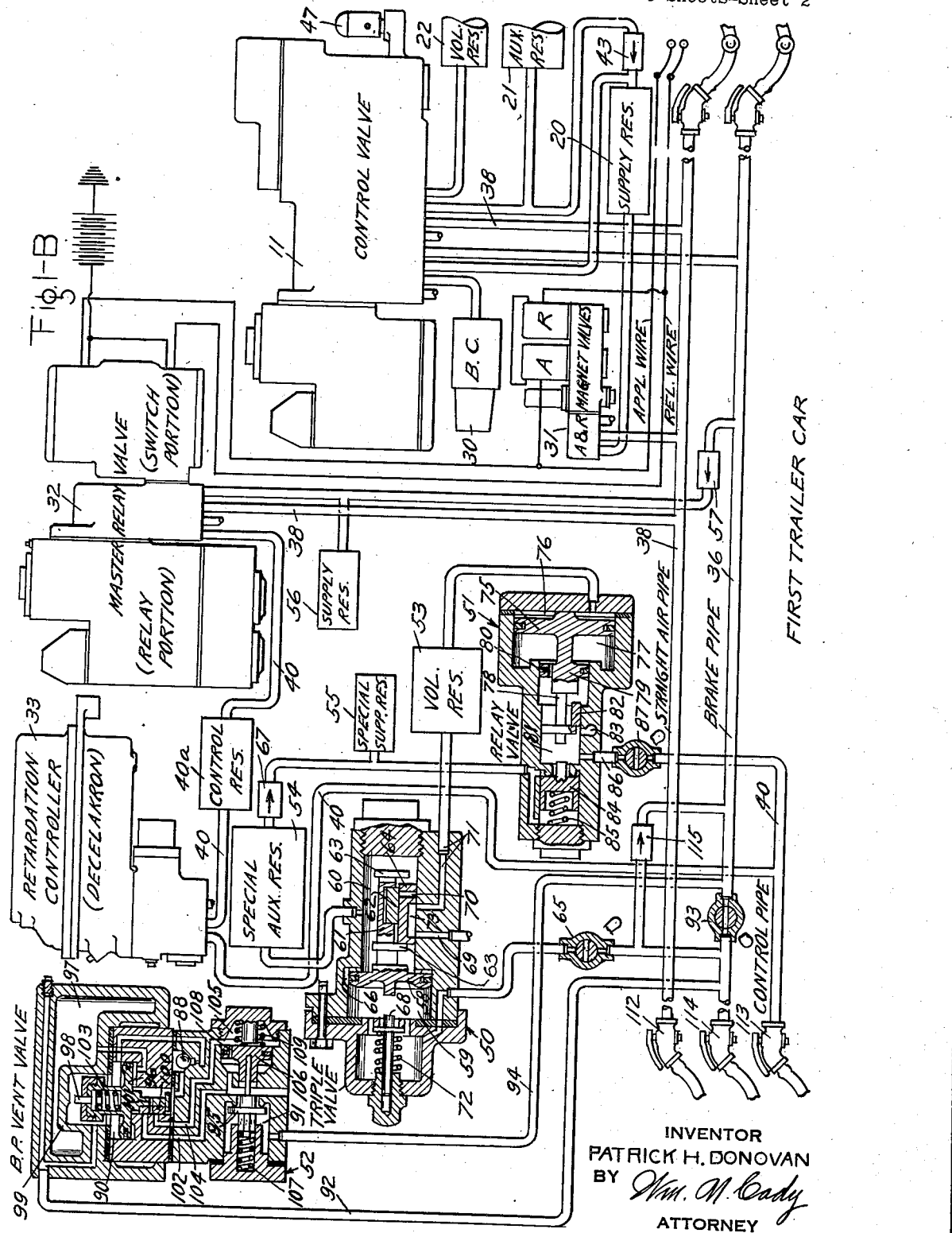

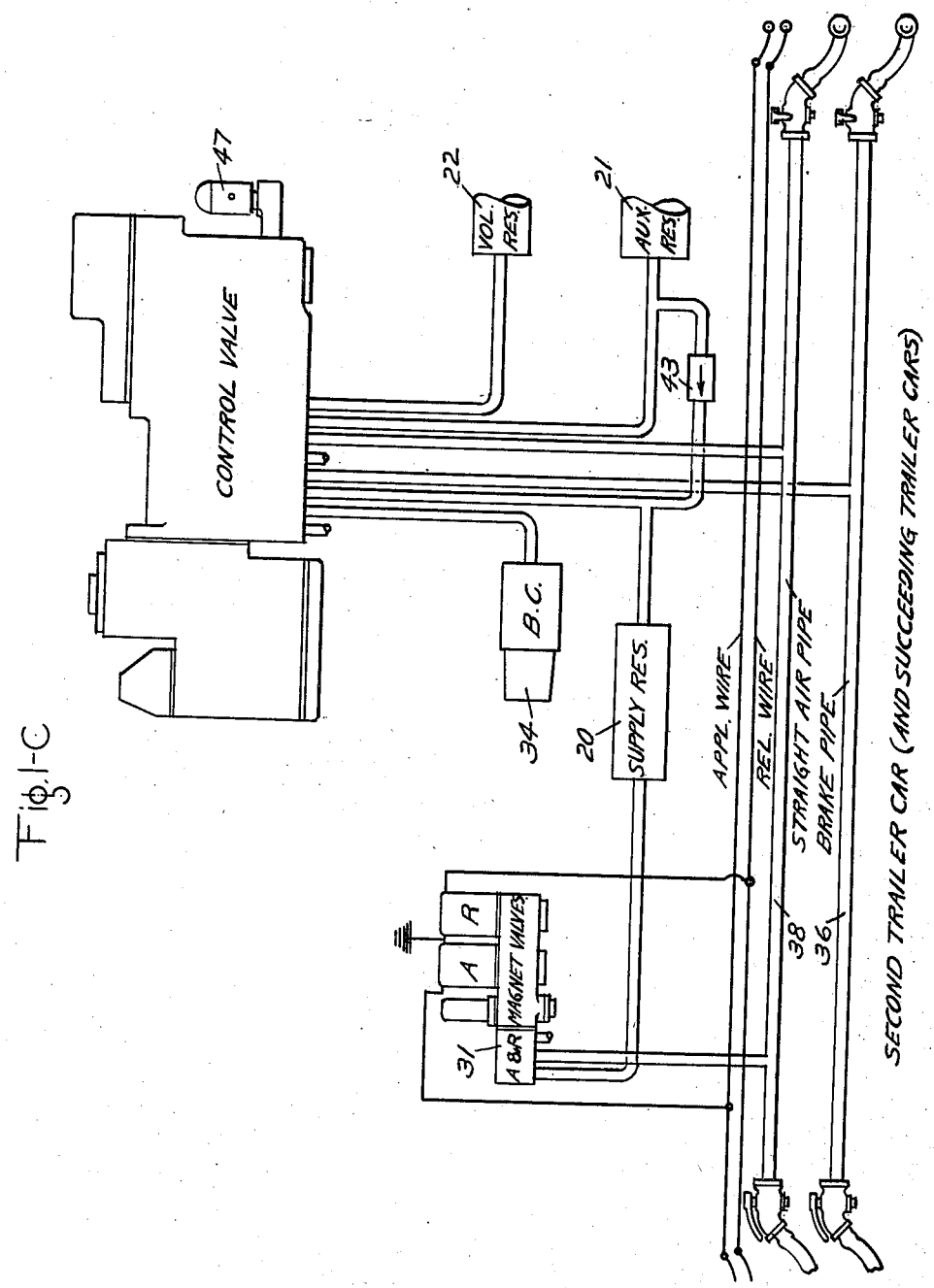

2,187,966

UNITED STATES PATENT OFFICE 2,187,966

HIGH SPEED BRAKE

Patrick H. Donovan, Chicago, Ill., assignor to The Westinghouse Air Brake Company, Wilmerding, Pa., a corporation of Pennsylvania Application October 16, 1936, Serial No. 105,956

12 Claims. (Cl. 303—13)

This invention relates to high speed brakes, and more particularly to braking equipment for passenger trains designed to operate at extremely high speeds.

Within recent years a number of new lightweight passenger trains have been designed to operate at extremely high speeds, as for example in the neighborhood of one hundred miles per hour or more. These new high speed trains generally comprise a relatively heavy power or motor car coupled to and pulling a series of light-weight trailer cars. Due to the problems presented in the braking of such high speed trains, a special brake equipment has been developed involving many novel and desirable features. This brake equipment is now known to those skilled in the art as the "HSC" brake equipment, and is illustrated and described in instruction pamphlet No. 5064, Sup. 2 (May 1935), published by The Westinghouse Air Brake Company, Pittsburgh, Pa.; and is also substantially described and claimed in the U. S. patent application of Ellis E. Hewitt, for a Brake equipment, Serial No. 741,063, filed August 23, 1934, now Patent No. 2,147,295, issued February 14, 1939.

While the new high speed trains have proven very satisfactory in operation, occasionally troubles will develop on the power or motor car such that it is either impossible or undesirable to continue operation of the power car for any extended period of time. In such exigencies, it is most desirable that the power car be disconnected from the trailer cars and other means, as for example a standard steam locomotive, be employed to haul the trailer cars during completion of the run, or until the power car will have been repaired.

As the "HSC" brake equipment was originally designed, upon disconnecting the power car from the trailer cars and then hauling the trailer cars by a standard steam locomotive, the brakes on the trailer cars could not be fully controlled by operation of the brake valve on the standard steam locomotive, nor would many of the most desirable features of the "HSC" equipment be retained.

The present invention has for its principal object an improvement in brake systems of the general type of the "HSC" equipment, whereby trailer cars of the new type high speed passenger trains may be disconnected from the high speed power car and reconnected to a standard steam locomotive, with the brakes on the trailer cars controlled from the usual brake valve on the standard steam locomotive in substantially the same manner in which they are normally controlled from the high speed power car, with all the many desirable features of the "HSC" equipment fully retained.

Other and more specific objects of the present invention, dealing with re-arrangements of parts, the employment of specific devices, and the incorporation of these in a complete high speed train brake equipment, will be more apparent from the following description, which is taken in connection with the attached three drawings, wherein Figs. 1A, 1B, and 1C, when taken together and placed end-to-end in the order named, illustrate an embodiment of my invention.

The instruction pamphlet No. 5064, Sup. 2, above referred to, illustrates the commercial form of the "HSC" brake equipment, while the Patent No. 2,147,295, also above referred to, shows an equivalent of the commercial form. In the drawings in the present application I have illustrated my improved brake equipment as a modification of the commercial form of the "HSC" equipment.

In order that my invention shall be clearly understood, I shall first describe the elements of the "HSC" brake equipment which are illustrated and then the operation of these elements as they function in the "HSC" equipment. Next I shall describe the rearrangement of the parts of, and the new elements which are added to, the "HSC" equipment to carry out the objects of my invention, and then the operation of the improved equipment as it embodies these elements.

"HSC" equipment

Considering first the portion of the equipment for the power car as illustrated in Fig. 1A, this includes one or more brake cylinders 10, a control valve device 11 for controlling the supply of fluid under pressure to and its release from the brake cylinder 10, an engineer's brake valve device 12, a No. 5-A vent valve device 13 (also sometimes called an emergency valve device), a deadman foot valve device 14, a cut-off valve device 15, a double check valve device 16, and a feed valve device 17. The various reservoirs comprise a main reservoir 18, which is connected to the usual compressor (not shown), a volume reservoir 19, which is provided to add capacity to the system, a supply reservoir 20, which provides the source of fluid under pressure when effecting straight air applications of the brakes, an auxiliary reservoir 21, which provides the source of supply when effecting automatic applications of the brakes, and a volume reservoir 22, which functions to limit the degree of automatic applications.

The feed valve device 17 delivers fluid at a chosen pressure from the main reservoir 18 to the volume reservoir 19. Connected to the volume reservoir 19 is a feed valve pipe 24, which, as illustrated, leads to the engineer's brake valve 12, to the No. 5-A vent valve 13, and serves to maintain the supply reservoir 20 charged by way of a one-way check valve device 25.

Also on the power car is a safety control pipe 26, which extends from the brake valve device 12 through the deadman foot valve 14, and the cut-off valve 15, to the No. 5-A vent valve 13. In addition, a charging pipe 27 extends from the engineer's brake valve also to the No. 5-A vent valve.

Considering now the portion of the equipment for the first trailer car, as shown in Fig. 1B, this includes one or more brake cylinders 30, a control valve device 11 therefor, an application and release magnet valve device 31, a master relay valve device 32, comprising both a relay valve and a switch mechanism, and a retardation controller device 33 (also commercially known as a decelakron). In addition, a supply reservoir 20, an auxiliary reservoir 21, and a volume reservoir 22 are provided for the same purposes as on the power car.

The other devices and parts illustrated in Fig. 1B on the first trailer car will be referred to and described later.

Considering now the portion of the brake equipment illustrated for the second and all succeeding trailer cars, as shown in Fig. 1C, this comprises one or more brake cylinders 34, a control valve device 11 therefor, an application and release magnet valve device 31, a supply reservoir 20, an auxiliary reservoir 21, and a volume reservoir 22.

Extending throughout the entire train are two principal control pipes, a brake pipe 36 and a straight air pipe 38. Extending from the double check valve device 16 on the power car to the master relay valve device 32 on the trailer car, by way of the retardation controller device 33 and a control reservoir 40a, is a control pipe 40. These three pipes are provided to control brake applications as will hereinafter be more fully described.

In illustrating portions of the "HSC" brake equipment, I have intentionally omitted certain parts because these have no relation to my invention and are not necessary to its understanding.

In the "HSC" equipment as designed, the parts heretofore referred to and illustrated as being located in part on the power car and in part on the first trailer car are normally all located on the power car, with the exception, however, that only one control valve device 11 and one group of reservoirs 20, 21 and 22 are normally supplied on the power car. The disposition of the parts in the present invention on the two cars, and the addition of the one control valve device and the aforementioned reservoirs, therefore, constitute a departure from and improvement upon the "HSC" design.

Operation of "HSC" equipment

Considering now briefly the operation of the "HSC" equipment, when the train is running the operator maintains pressure manually applied to either the brake valve handle 41, or to the foot valve pedal 42, or both. The equipment will then be charged as follows:

Fluid under pressure flowing from the main reservoir 18 by way of the feed valve device 17 to the volume reservoir 19 and feed valve pipe 24, will flow by way of check valve device 25 to charge the supply reservoir 20 on the power car. At the same time, with the brake valve handle 41 in release position, fluid under pressure will flow to the engineer's brake valve and from thence by way of charging pipe 27 to the No. 5-A vent valve. From this valve device fluid under pressure will flow to and charge the brake pipe 36. On the power car, as well as on each trailer car, the auxiliary reservoir 21 will be charged from the brake pipe through the associated control valve device 11. On the trailer cars the supply reservoirs 20 will be charged from the auxiliary reservoirs 21 by way of check valve device 43. A similar check valve device is also provided on the power car between the auxiliary reservoir 21 and the supply reservoir 20 on that car, but the charging of the supply reservoir on the power car is essentially by way of the check valve device 25.

With the brake valve handle 41 in release position the control pipe 40 will be at atmospheric pressure, and consequently the straight air pipe 38 will be at a like pressure.

Electropneumatic service application of the brakes

When it is desired to effect a normal service application of the brakes, the engineer's brake valve handle 41 is moved into the service application zone to a degree or extent according to the desired degree of application of the brakes. The engineer's brake valve is provided with a self-lapping mechanism which responds to this movement of the brake valve handle to establish in the control pipe 40, and control reservoir 40a, fluid at a pressure corresponding to the degree or extent of movement of the brake valve handle into the service application zone. The pressure established in the control pipe and control reservoir operates the switch mechanism in the master relay valve device 32. This switch mechanism controls the application and release magnet valve devices 31 on the trailer cars, and causes these devices to first close a communication between the straight air pipe 38 and the atmosphere, and to then connect the several supply reservoirs 20 to the straight air pipe. The switch mechanism in the master relay valve device 32 will lap the supply to the straight air pipe when straight air pipe pressure corresponds substantially to control pipe pressure.

Fluid under pressure in the straight air pipe 38 flows to the local relay valve portion of each control valve device 11, and this local relay valve portion functions to supply fluid under pressure from the associated supply reservoir 20 to the associated brake cylinders, the supply to the brake cylinders being lapped when brake cylinder pressure corresponds substantially to straight air pipe pressure. It follows therefore that brake cylinder pressure will correspond to brake valve handle movement.

The retardation controller device 33 is adjusted to limit the rate of retardation of the train to a predetermined safe value. If the degree of the brake application is such as to cause the rate of retardation of the train to exceed this safe value, then the retardation controller device will function to diminish the pressure in the control pipe 40 and control reservoir 40a, whereupon the switch mechanism of the master relay valve device 32 will cause operation of the application and release magnet valve devices 31 to reduce straight air pipe pressure. This correspondingly reduces brake cylinder pressure. The retardation controller device, therefore, modifies the control reservoir pressure to the extent necessary to limit the rate of retardation of the train to the predetermined or chosen value.

To release the brakes following a service application, the brake valve handle 41 is returned to release position, whereupon the control pipe will be vented to the atmosphere, resulting in operation of the switch mechanism in master relay valve device 32, the application and release magnet valve devices 31, and the local relay valve portion of each control valve device 11, to likewise reduce brake cylinder pressure.

*Automatic service application*

In the event that the electropneumatic portion of the brake equipment should become inoperative, a service application of the brakes may still be effected by moving the brake valve handle 41 beyond the normal service application zone to a position known as the automatic service position. In this position of the brake valve handle, the charging pipe 27 is disconnected from the feed valve pipe 24, and reconnected to an exhaust port in the brake valve. The communication between the charging pipe 27 and the brake pipe 36 in the No. 5-A vent valve is maintained, so that the brake pipe pressure is reduced at a service rate through the brake valve exhaust port. When a sufficient brake pipe reduction has been made, the brake valve handle 41 is turned to lap position.

Upon a service reduction in brake pipe pressure, a triple valve in each of the control valve devices 11 responds and supplies fluid under pressure from each auxiliary reservoir 21 to both the local relay valve portion of the control valve and to the volume reservoir 22, which are connected in parallel. The relay valve portion of each control valve effects a supply of fluid under pressure to the brake cylinders as before described for an electropneumatic service application.

The purpose of the volume reservoir 22 is to limit the pressure which may be developed in the brake cylinders during an automatic service application. The retardation controller device 33 controls only the pressure in the control reservoir 40a and since no pressure is developed in this reservoir during an automatic service application, it is desirable in order to avoid wheel sliding to limit the degree of brake cylinder pressure to a moderate value.

In order to effect a release of the brakes following an automatic service application, the engineer's brake valve handle 41 is returned to the release position, in which position the charging pipe 27 is again connected to the feed valve pipe 24, and consequently the brake pipe will be recharged. The triple valve portion of each control valve device 11 will then return to release position to effect the release.

*Emergency application*

When it is desired to effect an emergency application of the brakes, the brake valve handle 41 is turned to the position known as the emergency position. In this position of the brake valve handle, a vent valve in the engineer's brake valve itself is unseated to vent the brake pipe directly to the atmosphere, while a rotary valve blanks the charging pipe 27. At the same time, the self-lapping portion of the brake valve functions to supply fluid under pressure to the control pipe 40 to a maximum degree.

Also at the same time, the emergency reduction in brake pipe pressure causes operation of the No. 5-A vent valve device, which opens a vent valve to further reduce brake pipe pressure, and connects the feed valve pipe 24 to a pipe 46 leading to the double check valve device 16.

The double check valve device 16 contains a valve which is subject on one side to the pressure of fluid supplied by the self-lapping portion of the engineer's brake valve and on the other side to the pressure of fluid supplied from the pipe 46. This latter pressure will rapidly develop to feed valve pressure and consequently regardless of from which source the initial control pipe pressure is established, it will ultimately rise to feed valve pressure. Thus the No. 5-A vent valve functions to insure the establishing of control pipe pressure to the maximum possible degree, which of course results in a corresponding straight air pipe pressure.

The emergency reduction in brake pipe pressure also causes the triple valve in each of the control valve devices 11 to move to emergency position. Each triple valve will then connect its auxiliary reservoir to a communication which potentially leads to the local relay in that control valve device. However, a double check valve device is provided in each control valve and is subject on one side to straight air pipe pressure and on the other side to pressure of fluid supplied by the triple valve. Since the volume reservoir 22 limits the degree of pressure which may be supplied by the triple valve, it follows that the straight air pipe pressure will predominate and be effective in causing operation of the local relay valve in each control valve to supply fluid under pressure to the connected brake cylinders.

The shifting of the double check valve by the superior straight air pipe pressure causes the auxiliary reservoir 21 to be connected to a safety valve device 47 associated with each control valve device. This safety valve reduces the auxiliary reservoir pressure to a value such that its pressure will not cause the double check valve in the control valve to shift in the event that the retardation controller device subsequently reduces straight air pipe pressure to a lower value than auxiliary reservoir pressure. The pressure retained in the auxiliary reservoir is, however, high enough to insure stopping of the train in the event of failure of straight air pipe pressure.

The retardation controller device 33 will function as during an electropneumatic service application of the brakes, except however in the actual "HSC" equipment a connection (not shown) is provided between the No. 5-A vent valve and the adjusting mechanism of the retardation controller such that the permissible rate of retardation is increased during emergency applications, and this rate is then maintained throughout the entire deceleration period.

In order to effect a release of the brakes following an emergency application, the engineer's brake valve handle 41 is returned to release position. In this position the vent valve in the brake valve itself is closed and the brake pipe is recharged by way of the charging pipe 27. The No. 5-A vent valve is then returned to its normal or running position. At the same time, the No. 5-A vent valve disconnects the pipe 46 from the feed valve pipe 24, and reconnects the pipe 46 to the atmosphere Fluid under pressure in the control pipe 40 is then released to the atmosphere through the exhaust port in the brake valve device 12. A release of the brakes follows, since both the master relay valve device 32 and the triple valve in each control valve device 11 return to release position.

*Additions and changes to "HSC" equipment*

In carrying forward my invention in the form of an improvement upon the "HSC" equipment, I have found it necessary to rearrange the devices on the power car and first trailer car, as hereinbefore referred to. In addition, I have added an automatic valve device in the form of a triple valve 50, a relay valve device 51, a brake pipe vent valve device 52, a volume reservoir 53, a special auxiliary reservoir 54, and a special supply reservoir 55.

In the standard "HSC" equipment the relay valve portion of the master relay valve device 32 operated upon failure of the switch portion to function effectively within a predetermined length of time, to supply fluid under pressure to the straight air pipe from the feed valve pipe. Since in my modification the feed valve pipe does not extend to the first trailer car, I provide an additional supply reservoir 56, which, as illustrated in Fig. 1B, is normally supplied with fluid under pressure from the brake pipe by way of a check valve device 57. I have also added three cocks 65, 87 and 93, the purpose of which will be disclosed presently.

Considering now the added devices in detail, the triple valve 50 has been illustrated as being of the plain type, but it is to be understood that an improved form of triple valve would be preferable in practice. I have illustrated the plain type in order to simplify the understanding of my invention.

This triple valve is preferably embodied in a casing comprising a piston 58 subject on one side to the pressure of fluid in a chamber 59 and subject on the other side to pressure of fluid in a slide valve chamber 60. The piston 58 is provided with a stem 61 which is recessed to receive and move coextensive therewith a graduating slide valve 62. Secured to or integral with the stem 61 are two collars 63. These collars are adapted to engage a main slide valve 64 after a lost motion movement of the piston.

The chamber 59 is connected to the brake pipe 36 by way of cock 65. When the cock 65 is open so that the chamber 59 is charged to brake pipe pressure, fluid may flow past a feed groove 66 around the piston 58 to the slide valve chamber 60, and from thence to the special auxiliary reservoir 54 and to the special supply reservoir 55, the communication to the latter reservoir being by way of a one-way check valve device 67. The two reservoirs 54 and 55 may thus be charged to brake pipe pressure.

Upon a service reduction of pressure in the chamber 59, the overbalancing pressure to the right of piston 58 will shift it to the left until the piston engages the graduating stop 68. In this position of the piston the slide valve 64 will blank exhaust port 69, while a small service port 70 in the slide valve, now uncovered by the graduating valve 62, will connect the slide valve chamber 60 to pipe and passage 71 leading to the volume reservoir 53 and to the relay valve device 51. This latter communication will of course be lapped when the pressure in the slide valve chamber 60 reduces slightly below the pressure in the chamber 59.

Upon an emergency reduction of pressure in the chamber 59 the piston 58 will move the extreme distance to the left, compressing the graduating spring 72, whereupon the main slide valve 64 will uncover the passage 71 and permit the special auxiliary reservoir 54 to equalize with the volume reservoir 53.

Upon restoration of pressure in the chamber 59 the piston 58 will return the two slide valves to the release position illustrated. In this position a cavity 73 in the main slide valve will connect passage 71 to the exhaust port 69.

The relay valve device 51 is embodied in a casing having disposed therein a piston 75 subject on one side to pressure of fluid in a chamber 76 and on the other side to pressure of fluid in a chamber 77. As illustrated, the chamber 76 is in open communication with the volume reservoir 53.

Attached to the piston 75 is a stem 78 which carries a guiding element 79 having a small port 80 providing communication between the chamber 77 and a second chamber 81. The chamber 81 contains a slide valve 82 which is adapted, after a lost motion movement of the piston 75 to the left, to blank an exhaust port 83. Upon continued movement of the piston 75 to the left the stem 78 engages the stem of a supply valve 84 to unseat it against the bias of its spring 85. Unseating of the valve 84 opens a communication between the special supply reservoir 55 and a pipe 86 which leads to the control pipe 40 by way of cock 87. As is usual in relay valve devices, the pressure established in the chamber 81 will correspond to the pressure established in the chamber 76.

The brake pipe vent valve device 52 is embodied in a casing provided with two chambers 90 and 91. The chamber 90 is connected by way of pipe 92 to the brake pipe 36 on one side of cock 93, while the chamber 91 is connected by way of pipe 94 to the brake pipe on the other side of the cock 93.

The chamber 91 is adapted to be opened to the atmosphere upon the unseating of a vent valve 95, which valve is operated in response to movement of a piston 96, which is subject on one side to the pressure of fluid in the aforementioned chamber 90 and on the other side to pressure of fluid in a quick action chamber 97, which is charged from the chamber 90 by way of check valve 88. Upon a service reduction of pressure in the chamber 90 the piston 96 moves upwardly until a stop 98 associated therewith has engaged the casing member 99. In this position of the piston a slide valve 100 actuated by the piston is positioned such that a small or restricted port 101 therein registers with a passage 102 leading to the atmosphere. The port 101 is designed to permit or cause the quick action chamber pressure to reduce at substantially the same rate as the pressure in chamber 90 is reducing, so that the piston 96 is arrested in the position in which the stop 98 just engages the casing member 99.

Upon an emergency reduction of pressure in the chamber 90, the piston 96 moves to its extreme upper position, where the spring 103 behind the stop 98 is compressed. In this position of the piston the slide valve 100 uncovers a passage 104 while blanking the passage 102, thus permitting fluid under pressure from the quick action chamber 97 to flow by way of the passage 104 to piston chamber 105. Fluid under pressure in the piston chamber 105 acts upon piston 106 to unseat the vent valve 95 against the bias of its spring 107. Eventually the pressure in the chambers 105 and 97 will leak away to the atmosphere by way of the small port 108, and the spring 107 will thus shift the piston 106 back to its illustrated position, and at the same time close the vent valve 95. The piston spring 109 is a weak spring and will permit the return movement of the piston.

It will thus be seen that the brake pipe vent valve device is unresponsive to service reductions of pressure in the chamber 90 but responds to emergency reductions to cause unseating of the vent valve 95.

*Operation of the improved equipment*

With the improved equipment installed on a complete high speed train, as illustrated, the three cocks 65, 87 and 93 are turned to the positions illustrated. The brakes may then be operated from the power car as in the standard "HSC" equipment, and as previously described.

Assuming now that the power car has become disabled and is to be disconnected from the trailer cars, the first operation is to close the straight air pipe angle cock 112 and the control pipe angle cock 113 at the front end of the first trailer car. The brake pipe angle cock 114 need not necessarily be closed, because it is the usual practice when disconnecting the power car to vent the brake pipe so as to effect an emergency application of the brakes.

Assuming now that a standard steam locomotive, having either the well known 6ET or the equally well known 8ET equipment installed thereon, is connected to the trailer cars, the brake pipe of the steam locomotive is connected to the brake pipe 36 at the front of the first trailer car. The two cocks 65 and 87 are then turned to the open position, while the cock 93 is turned to closed position. The straight air pipe angle cock 112 and the control pipe angle cock 113 are maintained in closed position so long as a standard steam locomotive is pulling the trailer cars.

If now the brake pipe 36 is recharged from the steam locomotive, fluid under pressure will flow from the brake pipe through the cock 65 to the triple piston chamber 59, and from this chamber to the slide valve chamber 60 by way of feed groove 66. From the slide valve chamber fluid under pressure will flow to the special auxiliary reservoir 54 and also to the special supply reservoir 55, thus charging both reservoirs to brake pipe pressure.

Closing of the cock 93 divides the brake pipe 36 on the first trailer car into two sections. The section to the right of the cock 93 will be charged by way of the one-way check valve device 115. With the brake pipe throughout the train thus recharged, the brakes will be released in the usual manner.

If now it is desired to effect a service application of the brakes, the operator on the steam locomotive makes a service reduction in brake pipe pressure. This reduction in brake pipe pressure will be effected only in the section of the brake pipe to the left of the cock 93 on the first trailer car. The chamber 90 of the brake pipe vent valve device 52 is connected to this left hand section, but will, as before described, not respond to a service reduction in brake pipe pressure.

However, the triple valve 50 will respond and move to service application position. In service application position the service port 70 in the main slide valve 64 registers with the passage 71, so that fluid under pressure is supplied from the special auxiliary reservoir 54 to the volume reservoir 53 and the relay piston chamber 76. The volume reservoir 53 is provided so that graduated control of the relay may more readily be accomplished. The degree of fluid under pressure supplied to the volume reservoir and relay piston chamber will of course depend upon the degree of reduction in brake pipe pressure.

The relay valve piston 75 will upon an increase of pressure in the piston chamber 76 be shifted to the left, first moving the slide valve 82 to blank the exhaust port 83, and then unseating the supply valve 84. Fluid under pressure will then flow from the special supply reservoir 55, through the cock 87, to the control pipe 40 and control reservoir 40a, and from thence to the master relay valve 32, to effect an electropneumatic application of the brakes throughout the train in the same manner as described for the standard "HSC" equipment. The relay valve 51 will, of course, lap the supply to the control pipe 40 when control pipe pressure corresponds substantially to the pressure in the relay piston chamber 76.

It will thus be seen that while the brake application is initiated from the steam locomotive by effecting a service reduction in brake pipe pressure, only the electropneumatic portion of the equipment on the trailer cars responds to effect the application. Since the electropneumatic portion is under control of the retardation controller 33, it follows that the equipment on the trailer cars will be controlled in the same manner as in the standard "HSC" equipment.

When it is desired to effect a release of the brakes following a service application, the brake pipe is recharged from the steam locomotive in the usual manner, whereupon the triple valve 50 moves to release position, releasing fluid under pressure from the volume reservoir 53 and relay piston chamber 76, by means of the communition afforded when the slide valve cavity 73 connects the passage 71 to the exhaust port 69. This will result in the relay valve 51 venting the control pipe 40, and hence effecting a full release of the brakes on each of the trailer cars.

When it is desired to effect an emergency application of the brakes, the operator on the steam locomotive effects an emergency reduction in brake pipe pressure in the usual manner. The triple valve 50 then moves to emergency application position, supplying fluid under pressure to the volume reservoir 53 and relay piston chamber 76 to the maximum degree. The relay valve then establishes the maximum degree of control pipe pressure, and hence the electropneumatic portion functions to establish the maximum brake cylinder pressure.

At the same time, the brake pipe vent valve device responds to the emergency reduction in brake pipe pressure in the section of the brake pipe to the left of the cock 93, and, as before described, causes unseating of the vent valve 95. Unseating of this valve vents the section of the brake pipe to the right of the cock 93, so that the triple valve in each of the control valve devices 11 will function as described in connection with an emergency application of the standard "HSC" equipment. From this point on the apparatus will function in the manner described for the standard equipment.

To effect a release of the brakes following an emergency application, the brake pipe is again recharged whereupon the triple valve 50 returns to release position to effect a full release of the brakes as before described. The right hand portion of the brake pipe is of course recharged by way of the one-way check valve device 115, so that the triple valves in the several control valve devices 11 returned to release position.

While the three cocks 65, 87 and 93 are shown as separately operable, for the sake of simplicity in illustrating them, in practice I prefer to interlock them so that as cocks 65 and 87 are opened cock 93 is closed.

It will thus be seen that with the improved equipment as disclosed by this invention, the brakes on a high speed train may be fully controlled either from the regular power car, or from a standard steam locomotive substituted therefor, in a rapid and efficient manner similar to and comparable to the manner characteristic of the standard "HSC" equipment, and without sacrificing any of the advantages of that equipment.

It will, of course, be apparent to those skilled in the art that certain modifications may be made in the arrangement shown, and I do not wish to be limited to this exact arrangement, or otherwise than by the spirit and scope of the appended claims.

Having now described my invention, what I claim as new and desire to secure by Letters Patent, is:

1. In a vehicle brake system, in combination, a brake pipe, means for effecting either service or emergency reductions in brake pipe pressure, means operative responsive to a service reduction in brake pipe pressure for effecting an electropneumatic application of the brakes, and means operative responsive to an emergency reduction in brake pipe pressure for effecting by automatic operation an application of the brakes in the event that the electropneumatic application should fail to materialize.

2. In a vehicle brake system, in combination, a brake pipe divided into a first section and a second section, means operative to effect either a service or an emergency reduction in pressure in the first section of said brake pipe, means operative responsive to either a service or an emergency reduction in said first brake pipe section for electropneumatically effecting an application of the brakes, means operative only upon an emergency reduction of pressure in said first brake pipe section for effecting a corresponding reduction in said second brake pipe section, and means operatively responsive to said reduction in said second brake pipe section for effecting by automatic operation an application of the brakes upon the failure of said electropneumatic application to materialize.

3. In a vehicle brake system, in combination, a brake pipe divided into two sections, means for effecting either a service or an emergency reduction in pressure in a first section of said brake pipe, means including electroresponsive valve devices operative upon either a service reduction or an emergency reduction in said first brake pipe section for effecting an application of the brakes, means operative only upon an emergency reduction in said first brake pipe section for effecting a corresponding reduction in the second brake pipe section, and means operative responsive to a reduction of pressure in said second section for also effecting an application of the brakes.

4. In a vehicle brake system, in combination, a control pipe to which fluid under pressure is supplied to effect an application of the brakes, means responsive to the pressure of fluid supplied to said control pipe for controlling the degree of application of the brakes, a first automatic valve means for supplying fluid under pressure to said control pipe, means including a second automatic valve means for also supplying fluid under pressure to the control pipe, and manually operated valve means movable between two positions to render one or the other of said two automatic valve means effective to supply fluid under pressure to the control pipe.

5. In a vehicle brake system, in combination, a brake pipe, a control pipe to which fluid under pressure is supplied to effect an application of the brakes, a first automatic valve means operative only upon an emergency reduction in brake pipe pressure for effecting a supply of fluid under pressure to said control pipe, means including a second automatic valve device operative upon either a service or an emergency reduction in brake pipe pressure to effect a supply of fluid under pressure to said control pipe, and manually operated valve means movable between two positions to render one or the other of said two automatic valve means effective to supply fluid under pressure to said control pipe.

6. In a vehicle brake system, in combination, a brake pipe divided in two sections, means for effecting either a service or an emergency reduction in pressure in a first section of said brake pipe, a control pipe, a triple valve device responsive to both service and emergency reductions in pressure in said first section for effecting a supply of fluid under pressure to said control pipe, electroresponsive means responsive to pressure in said control pipe for effecting an application of the brakes, a retardation controller device for controlling the pressure in said control pipe according to the rate of retardation of the vehicle, means responsive to an emergency reduction of pressure in said first section of said brake pipe for effecting a corresponding reduction of pressure in the section of said brake pipe, and means operative upon the said reduction of pressure in said second section of the brake pipe for effecting the application of the brakes upon failure of said electroresponsive means.

7. In a brake equipment for a train comprising a power car and a series of trailer cars, in combination, a control pipe common to the power car and to the first trailer car, means operative upon supply of fluid under pressure to said control pipe to effect an application of the brakes throughout the train, a brake pipe extending throughout the train, an automatic valve device on the power car operative upon an emergency reduction in brake pipe pressure to effect a supply of fluid under pressure to said control pipe, a second automatic valve device on the first trailer car in the train and operative upon either a service reduction or an emergency reduction in brake pipe pressure to effect a supply of fluid under pressure to said control pipe, and manually operated valve means on the first trailer car operative in one position thereof to render said second automatic valve means ineffective and in another position thereof to render said first automatic valve means effective to supply fluid under pressure to the control pipe.

8. In a brake system for a train comprising a power car and a series of trailer cars, in combination, a control pipe common to the power car and the first trailer car, means operative upon a supply of fluid under pressure to said control pipe to effect an application of the brakes throughout the train, a brake valve device on the power car operative to effect a supply of fluid under pressure to said control pipe, and also operative to effect a reduction in brake pipe pressure at either a service rate or an emergency rate, a first automatic valve device on the power car responsive only to an emergency rate of reduction in brake pipe pressure for effecting a supply of fluid under pressure to said control pipe, a second automatic valve device on the first trailer car responsive both to service and emergency rates of reduction in brake pipe pressure for also effecting a supply of fluid under pressure to said control pipe, and manually operated valve means on the first trailer car operative to one of a plurality of positions to render said second automatic valve device unresponsive to either a service or an emergency rate of reduction in brake pipe pressure.

9. In a train brake system, in combination, a brake pipe divided into two sections, means operative responsive to either a service or an emergency reduction of pressure in a first section of said brake pipe to effect an application of the brakes, means operative also upon a service or an emergency reduction of pressure in the second section of said brake pipe to also effect an application of the brakes, and valve means responsive only to an emergency reduction of pressure in said first section for effecting a corresponding reduction of pressure in said second section.

10. In a brake system for a train comprising a power car and a series of trailer cars connected thereto, in combination, electrically operated valve devices on each of the trailer cars operative to effect an application of the brakes on that car, a switch mechanism on the first trailer car for controlling all of the electrically operated valve devices on all of the trailer cars, means on the power car for effecting the operation of said switch mechanism to effect an application of the brakes, and means on the first trailer car operative upon reductions of fluid pressure in a chamber for effecting the operation of said switch mechanism in the same manner as effected by operation of the said means on the power car.

11. In a brake system for a train comprising a power car and a series of trailer cars connected thereto, in combination, magnet valve devices on one or more trailer cars for controlling the application and release of the brakes on the trailer cars, a fluid pressure operated switch device on the first trailer car for controlling the magnet valve devices on all of the trailer cars, a pipe to which fluid under pressure is supplied to effect the operation of said fluid pressure operated switch device, a brake valve device on the power car operative to different positions to supply different degrees of fluid under pressure to said control pipe, an automatic valve device on the first trailer car operative to effect a graduated supply of fluid under pressure to said pipe, and manually operated valve means on the first trailer car operative when the power car is disconnected from the trailer cars to permit said automatic valve means on the first trailer car to be operated in response to reductions in brake pipe pressure on a towing vehicle temporarily connected to the first trailer car.

12. In a vehicle brake system, in combination, a brake pipe divided in two sections, an automatic valve device operative upon either a service or an emergency reduction of pressure in one brake pipe section for effecting an application of the brakes, means operative only upon an emergency reduction of pressure in said one brake pipe section for effecting a corresponding reduction of pressure in the other brake pipe section, and a check valve device operative to permit said other brake pipe section to be recharged as said one brake pipe section is recharged, and operable to prevent service reductions of pressure in said other brake pipe section in response to service reductions of pressure in said one brake pipe section.

PATRICK H. DONOVAN.